United States Patent [19]

Mez

[11] Patent Number: 4,508,479
[45] Date of Patent: Apr. 2, 1985

[54] DEVICE FOR PULLING TOGETHER

[76] Inventor: Georg Mez, Gartenstrasse 30A, 7416 Reutlingen Gonningen, Fed. Rep. of Germany

[21] Appl. No.: 299,731

[22] Filed: Sep. 8, 1981

[30] Foreign Application Priority Data

Jul. 7, 1981 [DE] Fed. Rep. of Germany ....... 3126670

[51] Int. Cl.³ ............................................. F16B 19/00
[52] U.S. Cl. ..................................... 411/340; 411/355
[58] Field of Search ............... 411/340, 351, 354, 355, 411/529, 337, 311

[56] References Cited

U.S. PATENT DOCUMENTS

| 1,402,566 | 1/1922 | Buhop | 411/340 |
| 1,682,658 | 8/1928 | Bosco | 403/409 X |
| 1,815,098 | 7/1931 | Earhart | 411/355 |
| 1,963,514 | 6/1934 | Wherren | 411/340 X |
| 2,299,308 | 10/1942 | Creighton | 411/340 |
| 2,360,395 | 10/1944 | Byron | 411/340 |
| 2,754,158 | 7/1956 | Bazzett | 403/409 |
| 3,722,932 | 3/1973 | Dougall | 403/409 X |
| 4,271,615 | 6/1981 | Jones | 403/409 X |

FOREIGN PATENT DOCUMENTS

| 739129 | 10/1932 | France | 411/355 |
| 935686 | 2/1942 | France | 411/355 |
| 325326 | 3/1972 | U.S.S.R. | 411/340 |

Primary Examiner—David H. Corbin

[57] ABSTRACT

A fastener for sheet metal has a head, a bifurcated stem, a cross-piece running radially through the stem, and a gripping keeper placed between the sides of said stem with a pin running through a cutout in said gripping keeper. At least one side of the cutout in the gripping keeper and the outer side of the gripping keeper next thereto are placed at a small angle to each other so that, after the fastener has been inserted through holes in two members to be fastened together, with the gripping keeper lined up with the stem, the gripping keeper may be turned through 90 degrees about the pin and then pushed in a direction generally normal to said stem, for example, by using a hammer, so that the two members are forced together by a wedging effect.

28 Claims, 10 Drawing Figures

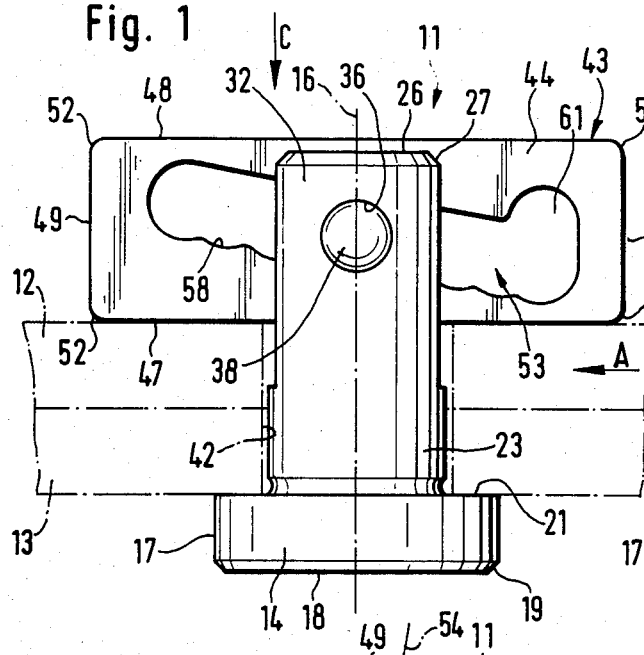
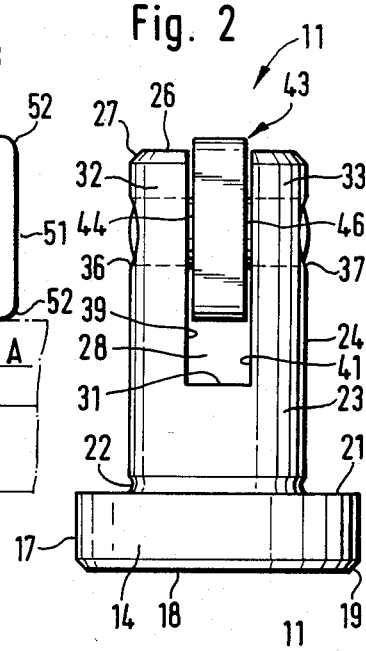
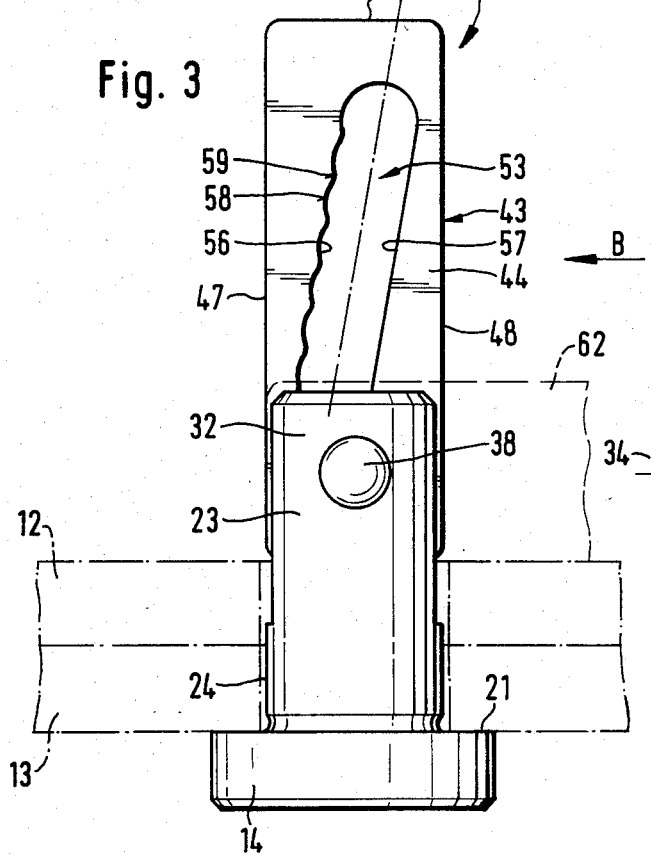
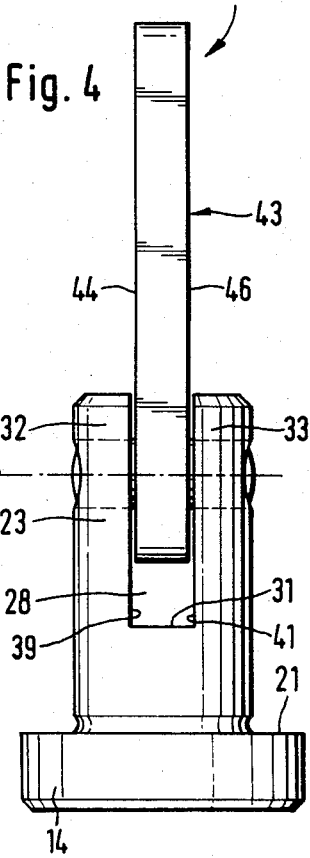

DEVICE FOR PULLING TOGETHER

BACKGROUND OF THE INVENTION

The present invention is with respect to a fastener for forcing together and fastening together at least two structures having lined-up holes, with a fastener head which is greater in size than the holes and having a shoulder facing the structures for resting against the outer face thereof, and a stem which is coaxial to the head and made in one piece therewith, the stem stretching out from the shoulder on the head and having an outline in agreement with the form of the holes in the structures to be fastened. By way of a gripping keeper, which has a working face turned towards the shoulder, the two structures may be fastened and kept together. As used in this specification, the term, "structures" which are fastened together is intended to mean members of any sort, which are capable of being fastened together by the invention.

In the prior art (see for example U.S. Pat. No. 3,923,326, FIG. 3) two corner pieces may be joined together by a fastening system which is furthermore used for pulling the two corner pieces together when the join is being made between them. The corner pieces have, in their outer corner parts, in-line holes 44 which, in the patent, are round. The stem of a screw is slipped through such a hole so that the screw's head 69 comes to rest against the outer side of the one corner piece. On the outer side of the other corner, a nut washer is placed and then a nut is screwed on the part of the screw stem stretching out through the hole. With the help of two spanners, the join is then done up tight. Because of nosepieces 64 and 68 acting as fulcrums, the legs 41 and 42 of the corner pieces 39 and 46 are pulled together. Such a system has, however, a number of undesired effects and properties, namely:

(a) Two spanners are needed, one for the nut and the other for the screw or bolt head.

(b) For each different size of screw and nut, a different size of spanner is needed.

(c) Three separate parts are needed in each case, that is to say the screw or bolt, the washer and the nut.

(d) Because the three parts are not permanently joined together, any one of them may be lost before fastening.

(e) Although all three parts are mass produced, there is a certain lower price limit, because male and female threads have to be cut and making hex heads is a high-price operation as well.

(f) Tight size limits have to be kept to as otherwise the parts may not be turned and done up tight with the spanners or the threads will become jammed or will have overmuch play. This side of fastener design is covered by a mass of industrial standards in many manufacturing countries.

(g) Of the threaded length of the stem, only a very small part is used for the nut and the rest of the thread cut is not used, but nevertheless has to be produced at a high price.

(h) The force is only taken up by the sides of the thread facing the structures fastened and the force only goes by way of the roots of the thread to the stem.

(i) On attempting to put on the nuts, it is readily possible to get them cross-threaded so that the first part of the thread may be stripped.

(j) Three different sorts of parts have to be warehoused which, for assembly, have to be put together in the right way.

(k) Frequently there is not enough space for turning the spanners.

(l) For turning a nut right round through one complete turn, the spanner has to be put on it and taken off it again at least twice, more commonly, however, five to ten times.

(m) If the fastener is to be undone, the same complex operation is necessary doing things in the opposite order.

(n) If the screws are used for keeping the holes, and the parts in which they are made, in line, such parts will only be supported on the tops of the thread on the screw and not over a large face, so that damage to the screw is likely.

(o) The height of the screw head and, furthermore, of the nut is made larger than is necessary for taking up the forces in question. In fact, the height, and, for this reason, the use of further material, of the heads and nuts is necessary so that they may be gripped with the spanners.

(p) If such fasteners are to be put in place in a works, power spanners are generally used to make the best use of man power. Such power spanners are, however, high in price and are very loud in operation. Furthermore, their electric cables may be cut at the sharp edges of sheet metal structures. If such fasteners are to be put in place on a building site, a special electric supply system has to be fixed up.

SHORT OVER VIEW OF THE INVENTION

One purpose of the present invention is that of designing a fastener of the sort noted which, generally speaking, takes care of the shortcomings in question.

In this invention, the fastener is so designed that the stem has an opening stretching therealong and the stem furthermore has a crosspiece running across and through the opening. The crosspiece is spaced from an end of the opening nearer to the head than an other end of the opening, the gripping keeper takes the form of a structure stretching through the opening out to each side of the stem, the keeper having a narrow cutout stretching therealong and two generally parallel side faces, at least one side of the cutout being at a small angle to the working face of the keeper and having teeth placed in a line along the keeper. The keeper is kept in position in the opening of the stem by the crosspiece's running through the cutout.

Such a connection with a fastener may be very quickly and simply be produced, the only tool needed by the worker being a hammer.

LIST OF FIGURES

An account will now be given of preferred working examples of the invention using the figures.

FIG. 1 is a side view of a fastener in the done-up condition forcing together two plates marked in chained lines.

FIG. 2 is a view looking in the direction of arrow A of FIG. 1.

FIG. 3 is a view on the same lines as that of FIG. 1 with the keeper turned into an upright or in-line position.

FIG. 4 is a view looking in the direction of arrow B in FIG. 3.

DETAILED ACCOUNT OF WORKING EXAMPLES OF MY INVENTION

Figure 5:
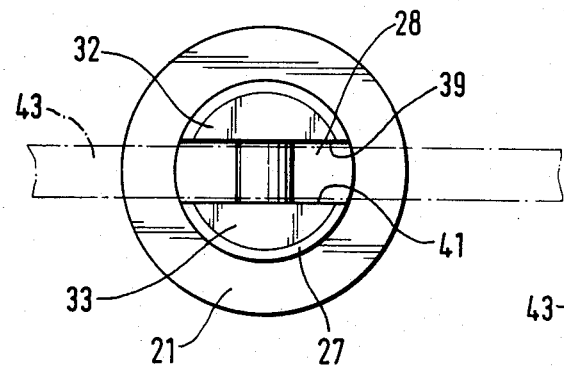
FIG. 5 is a view looking in the direction of arrow C of FIG. 1.

The weight of the fastener 11 forming the first working example of the invention is 21 g, the force produced thereby acting on structures 12 and 13 to be fastened together being 1240 kilograms. The fastener 11 has a head 14, which is coaxial to a geometrical lengthways axis 16 of the fastener. The head is 5.5 mm high and its outer cylindrical face 17 has a diameter of 16 mm. The end face 18 is radial, that is to say normal to the lengthways axis 16 and is round, it being joined up by way of a coned face 19 with the outer face 17. On its underside (turned upwards in FIG. 1) head 14 has a ring-like shoulder 21 which is coaxial to the lengthways axis 16 and is joined by an undercut groove 22 (FIG. 7) with a coaxial cylindrical stem 23 having a diameter of 10 mm and a length of 9 mm. Its outer cylindrical face 24 is smooth. Its end face 26 is radial, that is to say normal to the lengthways axis 16 and is joined up with the outer face 24 by a coned face 27 to make it easier for the fastener to be threaded into holes in structures to be fixed together. Symmetrically with respect to lengthways axis 16, stem 23 has a narrow opening 28 opening in end face 26 and having a breadth of 3.3 mm and, measured from the lowest point 29 of its floor 31 to the end face 26, 12 mm. Putting it differently, it may be said that, to the left and the right of the opening 28 there are two prongs 32 and 33.

At a distance of 10.5 mm from the end face 26, the geometrical lengthways axis 34 of two cross-running holes 36 and 37 will be seen, each such hole having a diameter of 3.9 mm. Each of such holes goes right the way through the side of the stem to the side of the opening, a round pin 38 of tempered material having been hammered into the cross-holes 36 and 37 so as to be running through said opening 28. Such pin 38 is, however, kept within the general outline of the round stem. Because the geometrical lengthways axis 34 of cross-holes 36 and 37 goes through the lengthways axis 16 of the stem, the round pin 38 is radial and is normal to the side faces 39 and 41 of opening 28. The side faces 39 and 41 are parallel so as to be forming chordal faces with respect to the round outer face 24.

But for the round pin 38, the head 14 and the stem 23 with the opening 24 may be forged true to size in a die so that the fastener is specially strong. However, these parts may furthermore be turned from solid material.

In comparison with the heads of screws, head 14 is, in relation to the diameter of the stem, lower. The diamater 42 of the hole in structures 12 and 13 is controlling for this.

A gripping keeper 43 is used with the stem and is made of steel. Its parallel side faces 44 and 46 have a distance of 4.2 mm from each other, this being, in other words, the thickness of the material of which the gripping keeper is made. In outline, gripping keeper 43 has a working face 47 which is forced towards the shoulder 21 for forcing the structures 12 and 13 together. Gripping keeper 43 furthermore has an outer face 48, opposite to the working face 47 and two end faces 49 and 51, which are parallel to each other and which, at their ends or corners, are rounded off at 52, at which point they are joined up with the working face 47 and the outer face 48. The end faces 49 and 51 have a distance between them of 30 mm and the working face 47 is at a distance of 10.2 mm from the outer face 48, the gripping keeper being generally a squared-off flat body.

As the reader will see from FIG. 5, keeper 43 is so thick as to be stretching generally from one side of opening 28 to the other. The keeper may, for this reason, not be pushed along round pin 38, but may be turned round pin 38 without anything in its way.

Figure 8:
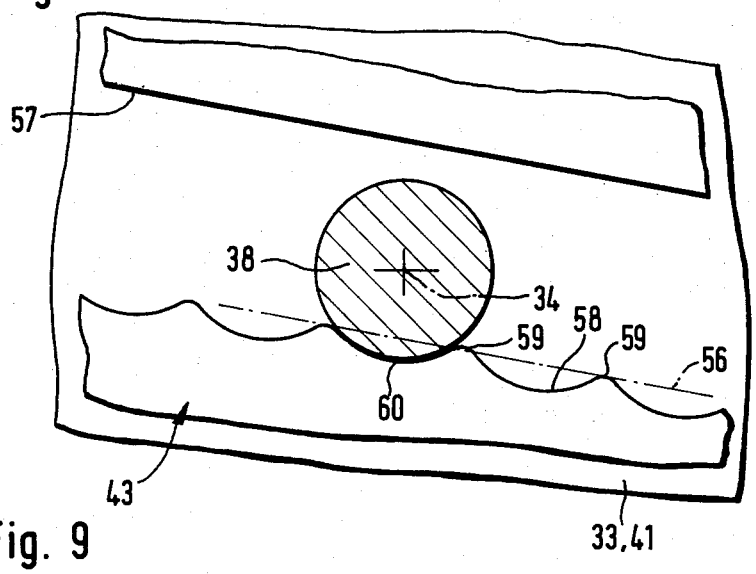
FIG. 8 is a cutaway view of the structure of FIG. 7, the keeper being in a position like that of FIG. 1.

Gripping keeper 43 has a cutout 53 stretching therethrough, whose geometrical middle axis 54 is at 10° to the working face 47. The side faces 56 and 57 of the cutout are generally straight and parallel to the middle axis 54. Side face 56 nearest to working face 47, however, has locking teeth 58 or waves, whose outline, as will be seen from FIG. 8, is made answering to the curved form of the outer face of round pin 38 so that, generally speaking, such curved parts between the teeth are part-cylindrical faces. The tops 59 (see FIG. 8) of the teeth 58 are rounded off so that such locking teeth 58 do not have any sawing effect on the round cotter pin 38. When forces come into play on the working face 47 and round pin 38 has been locked to rest in between wave-shaped teeth 58, forces produced on use of the structures joined together by the fastener, are not able to undo the fastener not only because of frictional braking effects, but furthermore because of the locking effect, because the lowest place 60 under the geometrical lengthways axis 34 of the round pin 38 is lower than the lowermost of the two tooth tops 59 next to the pin 38, this system functioning well even if not highly accurately made. It will furthermore be seen that the gripping keeper 43 may take into account any sloping parts on structure 12 while still functioning in the desired way.

As will be seen from FIG. 1, cutoff 53 is generally keyholed in form, its right hand end part 61 being broader and being one-sided inasfar as it is designed running out upwards towards the top face 48. This wider end 61 makes it possible for the gripping keeper 43 to be turned, see FIG. 3 (and furthermore FIG. 7), in such a way that the working face 47 and the outer face 48 are parallel to the outer face 24 of stem 23 (that is to say, truly in line therwith or somewhat within or without the stem, dependent on if the keeper is made a little smaller or a little greater in breadth than the stem diamater).

The wider part 61 of the keyhole-like cutout is so near the end face 51 that it is not possible for the same or the rounded off corners 52 to be jammed against the top face of structure 12 when gripping keeper 43 is turned out of its threading-through position (FIG. 3) in a clockwise direction through 90° so that it goes into the position 62 marked in broken lines in FIG. 3. After this, on hammering against end face 51, the keeper is pushed into its working position to be seen in FIG. 1.

It will furthermore be seen that there is a further condition for the design of the system: The middle axis 54 (and, for this reason, the side face 56) have to be at a great enough angle to make certain that, generally in the middle position of the keeper 43 (to be seen in FIG. 1) in relation to the stem, round pin 38 will be locked in a space between two locking teeth 58, the two wings or arms of the keeper 43 then being responsible for producing about the same force acting on the structures 12 and 13. If the angle of the side face 56 (or of the geometrical middle axis 54) is not great enough, then the round pin 38 would be in a position near the left hand end of cutout 53. Although it is true that the two wings of the keeper 43 do not have to be the same size, that is to say pin 36 does not have to be truly in the middle of keeper 43, if, however, round pin 38 were to make its way into a space 58 between two teeth in the top left of the cutout 53, the fastener 11 would not give the desired function.

If the slope were made even less, round pin 38 would be able to take up a position right in the left end of cutout 43 and without being locked inbetween two teeth 58.

If, on the other hand, the slope were overgreat, then the round pin 38 would come into a position between two teeth 58, that is to say not locked between two teeth. The best properties with the present working example of the invention are produced when structures 12 and 13 are 9.5 mm thick, but, however, a good fastening effect may even be produced if the thickness of the structures is somewhere in a range stretching from 9 to 11 mm.

In any case, the design of the present invention makes it possible for the material between the outer face 56 and the working face 57 to be made thick enough for producing the desired forces pushing the structures fastened together. The fact that the material between the wider end 61 of the cutout and the working face 47 is, generally speaking, thin, is unimportant, because the material between the side face 56 and the working face 47 is, in any case, only acted upon by bending forces and, for this reason, if the topside of structure 12 is more or less flat it, in any case, becomes thinner as looked at from the geometrical lengthways axis 16.

The material between the side face 57 and the outer face 48 is, as well, acted upon by bending forces and, for this reason, is not so important for producing the fastening forces as the material thereunder.

In the case of the working example noted so far, the crosspiece has been in the form of a round pin 38, this offering the useful effect that pin 38 may be made of higher quality material than the stem 23.

Figure 6:
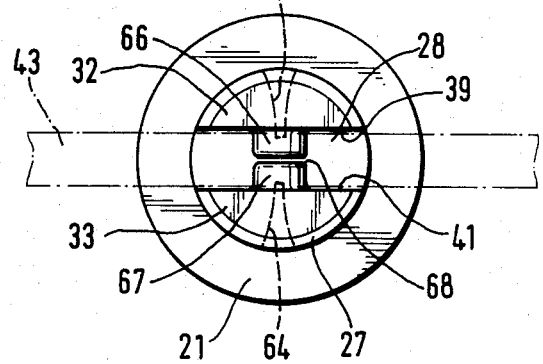
FIG. 6 is a view on the same lines as that of FIGS. 5 of a second working example of the invention, without its keeper, in which the crosspiece is produced in a different way.

However, it is possible for the crosspiece to be made by upsetting material into opening 28 from prongs 32 and 33 as will be seen in FIG. 6. In this process step funnel-like holes 63 and 64 are produced, pins 66 and 67 being moved together with material flow for forming the round pin 38.

It is not necessary for the ends of pins 66 and 67 to come together, so that there is a small space 68 between them.

Figure 7:
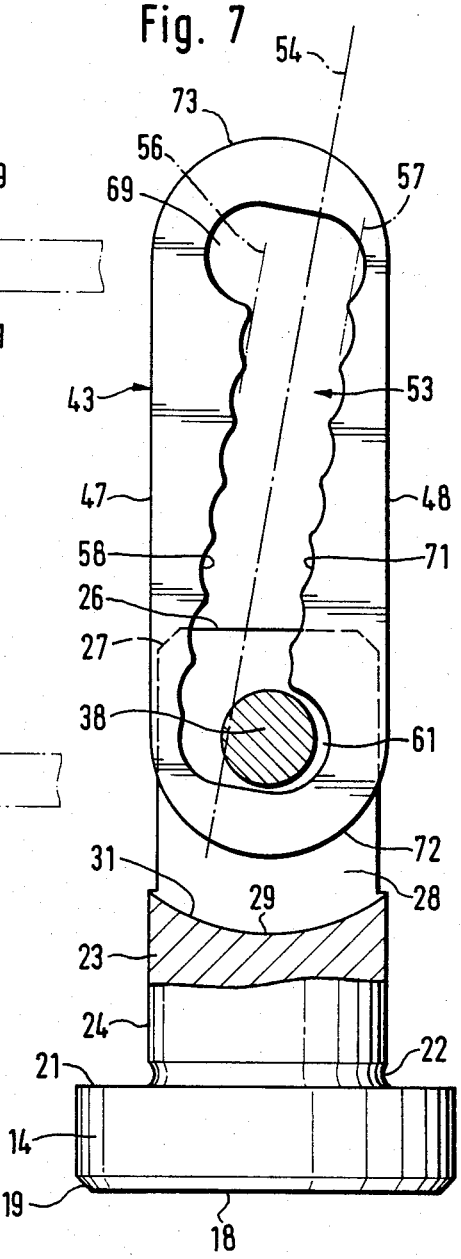
FIG. 7 is a view on the same lines as in FIG. 3, the view being partly cut away, of a further working example of the invention with a keeper of a design which has gone down well under working conditions.

As will be seen from the working example of FIG. 7, the cutout 53 is made wider at its two ends, that is to say at wider part or bite 61 and a second wider part or bite 69 of the same form. For this reason, the gripping keeper 43 may be turned about its one or the other end and be moved into a position in which it is in line with the stem. Furthermore, not only the one side face 56, but the two side faces 56 and 57 have like teeth 58 and 71.

In the case of this design it is not only the working face 57 which may be used opposite and turned towards shoulder 21 for forcing the structures 12 and 13 together, but furthermore that face on the other side of the keeper, which has so far been named outer face 48.

Furthermore, in the case of this preferred working example of FIG. 7 there are no separate end faces 49 and 51 but, in place thereof, half-round faces 72 and 73, this helping in threading the fastener into holes 42 through structures 12 and 13 when the gripping keeper is lined up with the stem of the fastener. A more useful effect of this working example of the invention is that the keeper 43 may be pushed into position by hammering at its left hand, or, if desired, at its right hand end.

Figure 9:
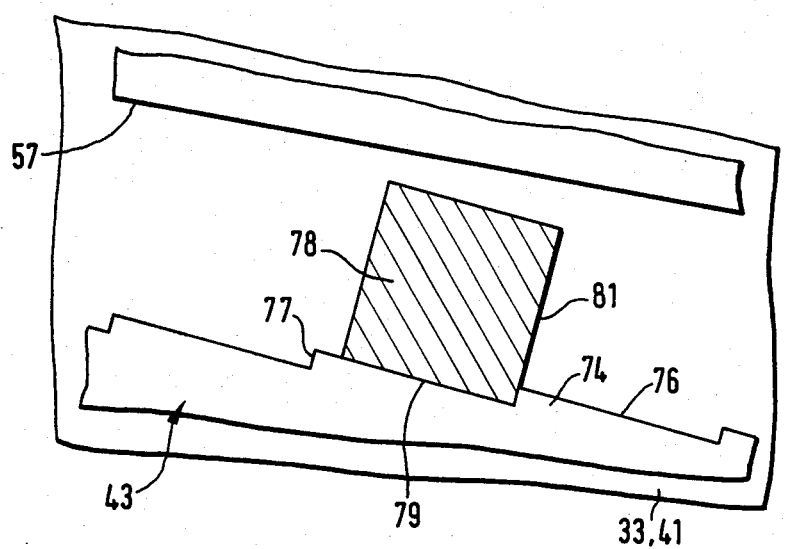
FIG. 9 is a view on the same lines as FIG. 8, but of a further working example.

It will be seen in FIG. 9 that, in place of the more wave-like locking teeth of the earlier working example, it is furthermore possible to have saw-teeth 74 which have, in each case, a long side 76, running generally in the direction of lengthways axis 54, so that the teeth may be slipped along under pin 78. Each tooth has a further side 77 generally normal to side 76, for locking the keeper in position as will be seen true to scale in FIG. 9. In this case, in place of the round pin, pin 78 is square in cross-section, its lower face 79 being parallel to the long tooth side 76 while its back side face 81, in its lower part, is able to go into a locked position to the back of the short face 77, this giving a safe locking effect while furthermore face 79 of the cross-pin is larger in size than the part of a round pin used for locking between teeth 58. However, the design of FIG. 9 is less good than the design with the round pin 38 and the wave-like teeth 58 inasfar as the gripping keeper 43, when done up tight, has to have a certain, given angle in relation to the lengthways axis 16. Furthermore, square cross-section pins 78 are only to be produced at a higher price than in the case of round pins 38.

Figure 10:
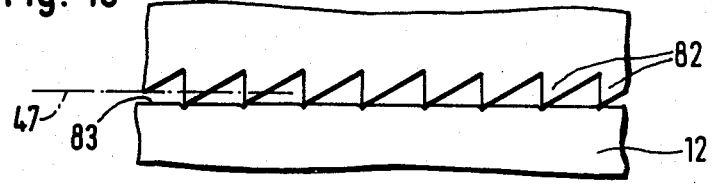
FIG. 10 is a part view of a further working example, on a very much greater scale, making clear the toothed working face of a keeper, whose saw-teeth are designed for biting into one of the two structures to be fixed together by the fastener and done up.

As will be seen from FIG. 10, the working face 74 has very small sawteeth 82 for biting into the top face 83 of structure 12. Because the sawteeth 82 are one-sided and, for this reason, give a ratcheting effect locking the keeper in the done-up condition, they make the fastener safer and give a locking effect.

In the working example of FIG. 7 such sawteeth or other forms of teeth or the like may be present on the outer face 48 as well.

A short comparison will make clear the great step forward in the art produced by the present invention: A screw in the metric size M 8 in line with DIN (German industrial standard) 406 has a tensile strength of 1250 kilograms. On the other hand, a fastener of the present invention has a very much higher strength, without this being balanced by any less desired properties of such fasteners. If the round pin is a pin in line with DIN 1481, the pin's shear strength will be 2×650 kg even if the round pin is not made of heat-treated material. With a heat-treated round pin, which in no way makes the price of the fastener any higher, a fastener of the invention is at least three times as good as such a screw. The head 14 and the stem 23 are best made by flow pressing, it then only being necessary for the opening 28 to be produced by machining.

If the structures 12 and 13 are to be thinner than the fasteners on hand are designed for, washers may be placed on the shoulder 21 and/or under the keeper 43.

What is claimed is:

1. In a fastener designed to be placed through two lined-up holes in members to be forced and held together, the fastener having:

a stem to be inserted through said holes, a head on said stem, said head being wider than said stem and having a shoulder adapted to rest against one of said members, said stem being coaxial with said head and made in one piece therewith, the shape of said stem being compatible with the shape of said holes in said members, and a gripping keeper movably connected to said stem and having a working face turnable towards said shoulder on said head, said gripping keeper being movable in relation to said head for forcing said members together; the improvement wherein:

said stem has an opening extending therealong and a crosspiece running across said opening;

said gripping keeper comprising an elongated member projecting through said opening out to each side of said stem;

said gripping keeper having two generally parallel side faces, both of said faces comprising turnable working faces of said gripping keeper, and a narrow cutout extending along said gripping keeper, both sides of said cutout being at a small angle to said working faces and having a row of rest waves extending therealong;

said crosspiece in said stem being arranged to run through said cutout in said gripping keeper to hold said gripping keeper in position in said opening of said stem.

2. A fastener as claimed in claim 1, wherein said stem is generally round in cross-section and has a smooth outer face.

3. A fastener as claimed in claim 1 wherein said stem has a cylindrical outer face, an end having a radial face, opposite to said head, and a coned surface which joins said radial face to said cylindrical outer face.

4. A fastener as claimed in claim 1, wherein said opening in said stem has parallel sides.

5. A fastener as claimed in claim 1, wherein said opening in said stem is symmetrical in relation to said stem in the lengthwise direction thereof.

6. A fastener as claimed in claim 1, wherein said opening in said stem has a face at the end of said opening nearest to said head, said end face being curved circularly in the direction of said head.

7. A fastener as claimed in claim 1, wherein said crosspiece is made of material upset from said stem.

8. A fastener as claimed in claim 1, wherein said stem has a pair of cross-holes running through it and said crosspiece is a separate pin having two ends positioned within said cross-holes.

9. A fastener as claimed in claim 8, wherein said pin is positioned radially to said stem and normal to said opening.

10. A fastener as claimed in claim 1, wherein said crosspiece has a round cross-section.

11. A fastener as claimed in claim 1, wherein said crosspiece has a sloping, sharply cornered face angled towards said head, and said gripping keeper is adapted to rest against said cornered face.

12. A fastener as claimed in claim 1, wherein said crosspiece is positioned near said head.

13. A fastener as claimed in claim 1 wherein the distance of said crosspiece from the end of said stem opposite to said head is no greater than the size of said gripping keeper measured along said stem.

14. A fastener as claimed in claim 13, wherein said distance is between 0.3 and 0.7 times the size of said gripping keeper, measured along said stem.

15. A fastener as claimed in claim 14, wherein said distance is between 0.45 and 0.55 times the size of said gripping keeper, measured along said stem.

16. A fastener as claimed in claim 1, wherein said gripping keeper has a size, measured along said stem, approximately equal to the thickness of said stem.

17. A fastener as claimed in claim 16, wherein the said size of said gripping keeper is in a range between the thickness of the stem $+5\%$ and the thickness of the stem $-15\%$.

18. A fastener as claimed in claim 16, wherein said size of said gripping keeper is equal to the thickness of the stem.

19. A fastener as claimed in claim 1, wherein said gripping keeper is longer than said stem.

20. A fastener as claimed in claim 1, wherein said gripping keeper has four rounded-off corners.

21. A fastener as claimed in claim 1, wherein said gripping keeper has at least one end part having an outer face that is part cylindrical.

22. A fastener as claimed in claim 1, wherein the thickness of said gripping keeper is 20% to 50% of the size of said gripping keeper, measured in the lengthwise direction of said gripping keeper.

23. A fastener as claimed in claim 22, wherein the thickness of said gripping keeper is 25% to 40% of the size of said gripping keeper, measured in the lengthwise direction of said gripping keeper.

24. A fastener as claimed in claim 1, wherein said cutout in said gripping keeper has, at both ends on at least one side thereof, a wider bite like the wider end of a keyhole section, arranged to enable said gripping keeper to be turned on said crosspiece.

25. A fastener as claimed in claim 24, wherein the size of said wider bite of said cutout is of a depth such that when said gripping keeper is lined up with said stem, said gripping keeper is approximately within the profile of said stem.

26. A fastener as claimed in claim 1, wherein said working face of said gripping keeper has a means which produces an increased frictional effect.

27. A fastener as claimed in claim 26, wherein said working face has a micro-roughness.

28. A fastener as claimed in claim 26, wherein the working face has sawteeth on it running across said face.

* * * * *